United States Patent [19]

Adame et al.

[11] Patent Number: 4,458,520

[45] Date of Patent: Jul. 10, 1984

[54] STEAM FLOODING SIMULATOR

[75] Inventors: I. Ernesto Adame, Garland; Jimmie Crofford, Arlington, both of Tex.

[73] Assignee: Mobil Oil Corporation, New York, N.Y.

[21] Appl. No.: 454,815

[22] Filed: Dec. 30, 1982

[51] Int. Cl.$^3$ .................. G01N 15/08; G01N 25/00
[52] U.S. Cl. ..................... 73/38; 73/432 R; 73/432 SD; 374/45
[58] Field of Search ............ 73/38, 432 R, 432 J, 73/432 SD; 374/45

[56] References Cited

U.S. PATENT DOCUMENTS 2,987,830  6/1961  Jackson ........................ 73/432
4,304,122 12/1981  Tentor ....................... 73/432 SD

FOREIGN PATENT DOCUMENTS 649844  2/1979  U.S.S.R. .................... 73/432
741109  6/1980  U.S.S.R. .................... 73/432

Primary Examiner—S. Clement Swisher
Attorney, Agent, or Firm—Alexander J. McKillop; Michael G. Gilman; Charles J. Speciale

[57] ABSTRACT

Apparatus and methods for simulation of steam flooding oil recovery operations are disclosed. The steam flooding apparatus comprises an elongated chamber to which sand is supplied. The mass, permeability and porosity of the sand is measured. The sand is then flushed and is filled with oil to the degree desired. A steam generator, which is designed so as to eliminate diphasic steam/water conditions while permitting accurate measurement of the quality of the steam and of the mass injected, supplies steam to the chamber. The quality of the steam is carefully recorded, and the pressure within the chamber and the temperature is recorded as a function of time. Steam overflood conditions and the effect of various coinjectants can also be evaluated using the apparatus and techniques according to the invention.

10 Claims, 5 Drawing Figures

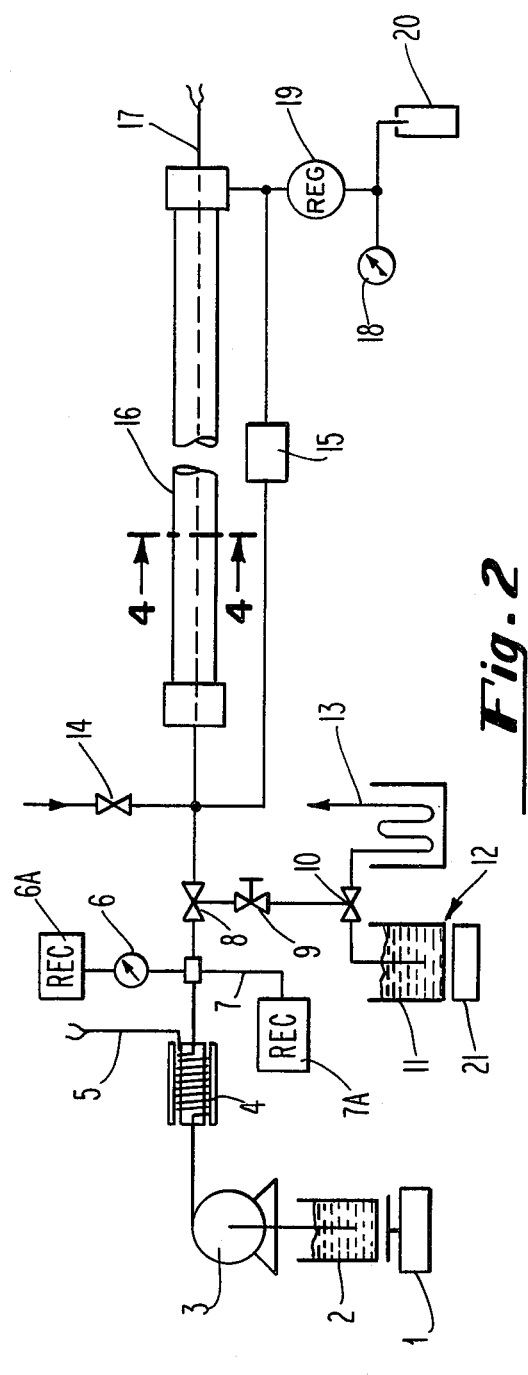
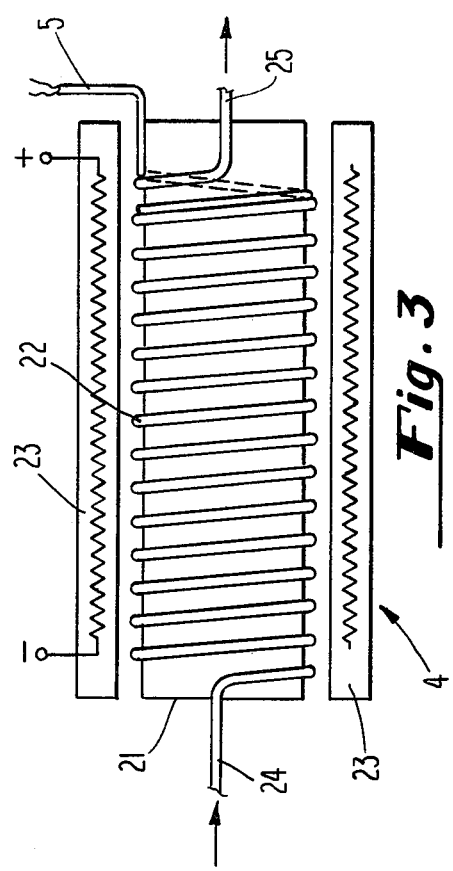
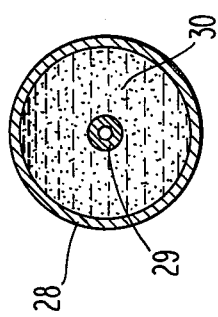

STEAM FLOODING SIMULATOR

FIELD OF THE INVENTION

This invention relates to a method and apparatus for modeling conditions encountered in oil field recovery operations. More particularly, the invention provides a method and apparatus whereby the conditions of a porous rock oil reservoir can be modeled in the laboratory so as to test various possible recovery techniques.

BACKGROUND OF THE INVENTION

The ever increasing need for hydrocarbons and their increasing rarity has led to the development of many new methods for recovering oil from previously worked formations. Many of these methods are very difficult to optimize in the field due to the great number of variables which can be encountered. Accordingly, it is desired to provide laboratory apparatus for modeling a real oil reservoir. More particularly, one method which appears promising is the use of steam flooding, in which steam is introduced at one point in a reservoir to encourage the movement of oil towards a well from which it can be recovered. However, there are numerous problems which are encountered in such operations and it is very difficult to determine what variable is causing a particular effect in the field. Accordingly, it is desirable to provide laboratory apparatus for modeling such situations. Such an apparatus would desirably allow variation of numerous process variables and physical models of the reservoir, and would furthermore allow testing of coinjectant materials mixed with the steam.

OBJECTS OF THE INVENTION

Accordingly, it is an object of the invention to provide laboratory apparatus for simulation of oil reservoir operating conditions whereby various experiments can be carried out in a timely and efficient fashion to determine which of a plurality of possible alternatives would lead to most efficient recovery of additional oil.

A more particular object of the invention is to provide a laboratory apparatus for simulating oil reservoir conditions whereby steam flooding techniques can be more effectively evaluated than was possible according to the prior art.

A further object of the invention is to provide a steam flooding simulator for modeling an oil reservoir in a laboratory situation in which the effect of coinjectants can be evaluated.

SUMMARY OF THE INVENTION

The above mentioned needs of the art and objects of the invention are satisfied by the present invention which comprises a steam flooding simulator which provides a laboratory model of a given well. The apparatus comprises high pressure pumps, a steam generator, a core chamber for containing a mixture of sand and oil to simulate the conditions existing in the formation of the well, pressure transducers, thermocouples, and temperature and pressure recorders.

BRIEF DESCRIPTION OF THE DRAWINGS

The invention will be better understood if reference is made to the accompanying drawings, in which:

FIG. 2 shows a schematic view of the steam flooding simulation apparatus according to the invention;

FIG. 3 shows an enlarged view of a steam generator used in the preferred embodiment of the invention to generate the steam used in the experiments;

FIG. 4 is a cross-section of the core chamber taken on the line 4—4 of FIG. 2.

DESCRIPTION OF THE PREFERRED EMBODIMENTS

As discussed above, steam flooding, i.e., supply of highly pressurized, high temperature steam to a reservoir to force out oil not otherwise recoverable is one of the most attractive techniques for enhanced oil recovery. However, in order to design and operate an efficient steam flooding process it is necessary to fully understand the behavior of the oil-water-reservoir system during steam flooding. This understanding is also necessary to test and refine theoretical approaches to improve methods of recovery prediction, ultimately to increase field production. The prior art does not show any adequate method for modeling a steam flooding operation and accordingly this is a primary object of the invention as discussed above.

Figure 1:
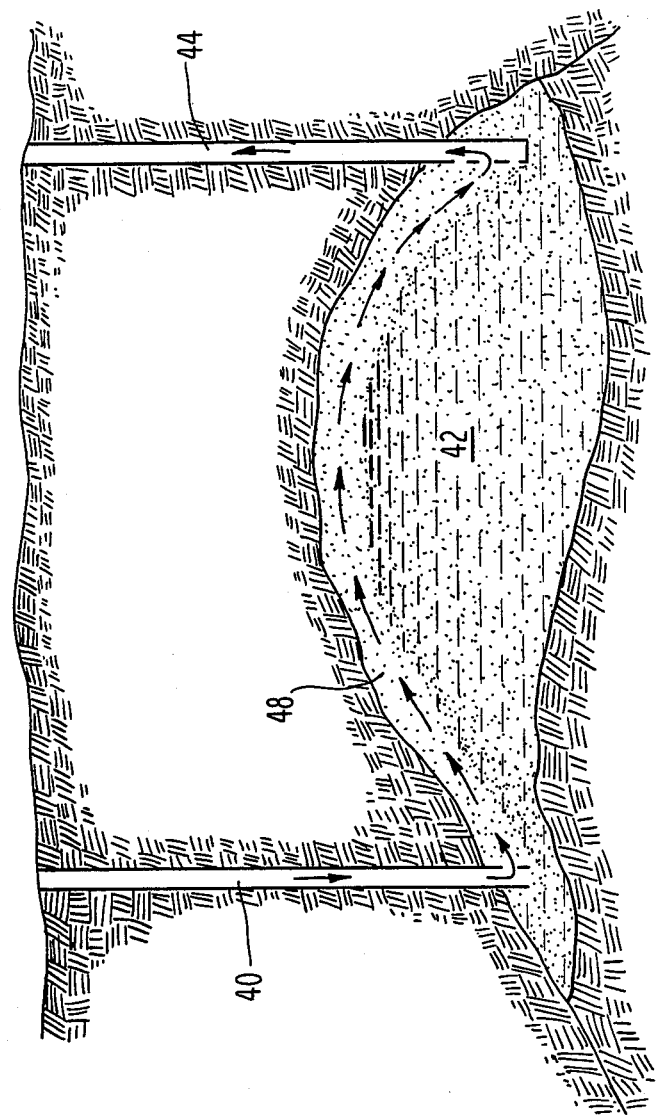
FIG. 1 illustrates use of steam flooding recovery techniques and exemplifies problems that can be encountered therein.

FIG. 1 shows broadly the way in which steam flooding operations are carried out. Steam is supplied through a first well 40 to an oil reservoir 42 typically of porous sandstone or other rock with oil impregnated in the pores therein. The steam supplied forces the oil under pressure to a recovery well 44. The pressure and the heat of the steam both play a role in causing oil to flow through the pores of the rock 42 and into the recovery well 44. It will be noted that in the drawing there is shown a void area indicated generally at 48 through which most of the steam is shown flowing. This phenomenon is known as "steam override" and is quite frequently observed. It occurs because the steam is much lighter than the oil and therefore tends to first establish a flow path along the upper portion of the reservoir, thus greatly limiting its utility. Various techniques for alleviating this problem have been tried, including the addition of coinjected materials which tend to foam up and fill the void space 48. Again, it is desirable that such phenomena be adequately modeled in the laboratory so as to enable accurate comparative testing of various proposals to solve this difficulty.

The experimental apparatus is shown schematically in FIG. 2. The main element of the system is a core chamber 16, which will typically comprise a tubular cell for holding the model reservoir. For example, the cell 16 might be filled with sand, have its pore volume measured, be flushed with water and then filled with an oil or an oil-water mixture, depending on the condition to be simulated. At both ends are fine screens to prevent the sand from being produced. The cell 16 is also fitted with heaters (not shown) to keep the oil viscosity at a reasonable level and to simulate field conditions, which sometimes involve elevated temperatures. Down the center of the tube, that is, within the sand/oil/water mix, runs a thermowell which comprises a long slender tube for insertion of movable thermocouples to allow accurate measurement of the temperature within the reservoir. The utility of this measurement will be explained in further detail below.

The present inventors have determined that it is crucial to experimental integrity that the steam quality, i.e., the enthalpy of the steam, be very carefully measured and controlled. Meaningless results can be obtained unless this variable is accurately monitored. Accordingly, to do so was one of the prime objects of the design of the apparatus according to the invention.

Accordingly, another important element of the apparatus shown in FIG. 2 is the steam generator 4. As noted above, the enthalpy of the steam which is injected into the simulated reservoir 16 must be very carefully monitored. This can be done by measuring the amount of water used to form steam, and the steam's temperature and pressure, if one ensures that all the water is effectively turned to steam. The steam generator used provides this function. Its design is shown in further detail in FIG. 3. The steam generator 4 is supplied with metered amounts of water from a reservoir 2 mounted atop a balance 1 under high pressure from a pump 3. The pump 3 may be the model no. Mod. 110-A of the Altex Company, or any other positive displacement pump. The steam generator is located within a heater and a control thermocouple 5 is provided to regulate the heat input to the steam generator 4. A second thermocouple 7 measures the temperature of the steam after it exits the steam generator and its pressure is measured by a pressure gauge 6. The outputs of the thermocouple 7 and pressure gauge 6 are recorded by recorders 7A and 6A, respectively. A calorimeter 12 measures the heat content of the steam; coupled with the measurement of its mass and pressure, the enthalpy can be determined. The calorimeter 12 may comprise a Dewar flask 11 which contains a predetermined amount of water at a measured temperature. This reservoir is desirably provided with a magnetic stirrer 21. Steam is passed by way of valves 8, 9 and 10 to the beaker 11. Valve 9 is a metering valve to allow measurement of the amount of steam passed, which is then dissolved in the water in the Dewar flask 11. The water temperature is measured before and after introduction of the steam, so that the charge in energy content of the water can be calculated. The relative enthalpy of the steam can then be calculated using the relative ratios of the mass of steam added and of the water. This process is discussed in further detail below under the heading "Steam Quality Measurement."

The core chamber 16 is arranged to permit measurements to be made of the temperature at points along the thermowell 17. An example of typical experimental results is shown below in FIG. 5. The temperature at various locations along the tube 16 is measured and recorded as a function of the amount of steam injected, which can conveniently be measured in units of the total pore volume of the pack. The pore volume of the pack is typically measured prior to each run. It may simply be calculated by subtracting from the volume of the tube the volume of the sand and the volume of the thermowell; the volume of the sand is calculated by dividing the mass of the sand injected by its density.

After the run has continued for a period of time, oil begins to be produced at the outlet of the pack. Its back pressure can be regulated by a regulator 19, and the produced oil is collected in a liquid receiver connected thereto as in the position of reservoir 20. Its pressure is monitored by a second pressure gauge 18. The pressure across the two ends of the core sample tube 16 can also be measured by pressure transducer 15.

If it is desired to simulate use of coinjectants or the like, these can be readily supplied by means of a valve 14 attached to the input line of the core pack.

Finally, a vent condenser 13 is provided to allow release of the pressure in the system at the conclusion of an experimental run, and for pressure control during the run.

Prior art systems in which steam is generated for laboratory use typically involve electrode-type commercial steam generators even when only small amounts of steam were required for the experiment. Such generators are bulky and expensive to run. According to the present invention there is provided a simple, small, inexpensive and much more controllable steam generator. This is shown in FIG. 3. It comprises a generally cylindrical iron core 21 about which is wrapped a stainless steel tube 22. The assembly is enclosed within a tubular furnace 23 so that when water is admitted at an inlet side 24, it is heated very rapidly and passes out of the exit 25 as super heated steam. A thermocouple 5 is wrapped around the iron core 21 and used to control the heater temperature. A second thermocouple 7 (FIG. 2) may be provided to measure the actual steam temperature on the output side.

In a preferred embodiment of the invention the stainless steel tube 22 is ⅛ inch in outside diameter, 25 feet long to give a total volume of 13.13 cc. It is coiled tightly around a solid iron cylinder 21 acting as a heat sink 2 inches in diameter by 4 inches long. Using a stainless steel tube of these dimensions, i.e., substantial length and very small diameter results in a system which acts essentially as a liquid-full system, i.e., there is no diphasic flow, which would complicate enthalpy calculations. The thermocouple 5 controls the power supplied to the tubular heater 23, which may be of the kind made by the Lindberg Company. In the embodiment described, a 1380 watt heater was adequate to generate 600° F., 700 psi steam at a mass flow rate of at least 20 gm/min, as measured using Dewar flask 2 and balance 1 (FIG. 2).

In observation of the operation of this steam heater it was noted that after 15 or 20 experimental runs, the coil 22 begins to leak at its inner surface. The causes of this leaking are presumably basicity of the distilled water used or the presence of dissolved oxygen in the water. In the preferred embodiment of the invention, the water is deaerated and then treated with excess hydrazine. This treatment is more costly than using sodium sulphite but hydrazine does not leave a precipitate since it only releases nitrogen. In any case it is recommended that the coil 22 be replaced frequently, e.g., after about 50 hours of operation, in order to prevent a serious accident.

FIG. 4 shows a cross-sectional view along the lines 4—4 of FIG. 2 detailing certain features of the sand pack assembly 16. In the preferred embodiment discussed above in connection with the heater 4, the sand pack consists of a stainless steel tube 28, 2 inches in diameter and 54 inches long with a 0.120" wall thickness. At each end of the pack two screens one of 60 mesh and one of 230 mesh were placed to prevent sand production, i.e., sand escaping under the pressure of the steam flooding operation. The thermowell 29 at its center is of 0.095" outside diameter. The temperature distribution throughout the length of the tube is monitored by manually moving a Chromel-alumel thermocouple 17 (FIG. 2) along the thermowell. Heating tapes were placed on the outside surface to allow heating of the oil pack during the oil saturation and hot water flood stages (discussed below), and when cleaning the pack. Additional thermocouples, spaced along the length of the tube 28 indicate the phenomena of steam override (discussed above in connection with FIG. 1) which is observed even in these comparatively small diameter packs. The pack is fitted, as noted, with a pressure transducer 15 (FIG. 2) which allows for determining the differential pressure due to oil embankment and a back pressure regulator 19. In use, the pack along with the steam generator is rested horizontally and insulated in about 6 to 8 inches of vermiculite. The method of practice of the methods of the invention will now be discussed in detail.

The sample tube 28 is packed with the core material 30, being careful that the thermowell 29 is centered in the pack at all times. Cleaned and dried formation sand is normally used to model typical field-like conditions. The pack is then capped and the thermocouples are attached to the outer surface. The permeability of the pack is measured using nitrogen. This is discussed further below under the heading "Permeability Determination." Then the pressure transducer 15 and the steam lead line are connected, and the whole system is placed horizontally in a wooden box. The system is pressured up to 500–600 psig to check for leaks. Afterward, the pack and the steam generator are covered with vermiculite or other suitable insulating material.

The pore volume of the pack is then determined using the following procedure. In order to insure a meticulous balance, both volumes and masses of injectants are recorded. The pack is placed under vacuum overnight at room temperature. Using a Ruska metering pump as at 3, the pack is filled with formation water. Water from a reservoir can be pumped into the pack by pumping a non-miscible, heavy displacement fluid such as mercury into the reservoir. The injection is continued until the slight buildup of pressure does not equilibrate after stopping. The volume of the mercury is measured. From this reading the determined pore volume can be calculated. This also provides a measure of the mass injected, and is an independent check of the material balance.

Next, the exit valve on the pack is opened. The heating tapes are turned on and the pack is heated to 140°–150° F. The mass of the water of expansion is measured. The oil reservoir 20 (FIG. 2) is connected with stainless steel tubing. A heating tape and a controlling thermocouple are placed on the lead line. Both the masses of the oil reservoir 20 and the oil in the lead line are recorded. It is then warmed to 150° F. and the oil is allowed to expand into a small beaker. The mass is recorded. The oil reservoir 20 is then connected to the pack which has been kept warm at about 150° F. and is flooded with oil. The mass of the water displaced from the pack is recorded. The Ruska pump is stopped at the precise time that oil is produced on the exit port of the pack, and the slight pressure buildup is allowed to equilibrate. The final mass of the reservoir 20, oil, mercury and lead line are recorded.

Next, essentially the same procedure is carried out again, except that this time water at about 150° F. is injected. The oil saturation is reduced by flooding the pack with about three pore volumes. This ensures simulation of the real well, in which the oil is usually mixed with water in the porous formation. Again, careful measurements of masses and volumes are made and recorded.

At this point the pack is ready to steam flood. The back pressure regulator 19, at the exit port, is set to a given value, normally corresponding to the reservoir pressure. The steam generator 4 is heated slowly to a temperature of about 550° F. The calibrated high pressure pump 3 is connected and controlled to deliver steam at a measured rate. The steam is diverted to a vent condenser 13 (FIG. 2), by the manipulation of the two 3-way ball valves 8 and 10 (FIG. 2). The system is pressured to 50–100 psi above the value of the back pressure regulator by using the throttling needle valve 9 (FIG. 2), until a steady state is reached. The pressure recorder 6A is zeroed, and temperature recorder 7B, connected to thermocouple 7 is allowed to operate. An internal base temperature profile of the pack is taken. The steam quality is measured by any of a number of methods (see below, under the heading "Steam Quality Measurement"). Once the desired quality is reached, both end valves on the pack are opened, and simultaneously the balance 1 (FIG. 2) is tared, a timer (not shown) is turned on, and steam is diverted into the pack, using the 3-way valve 8 (FIG. 2). Samples of the produced fluids, approximately 125–150 mls, are collected at the exit side in 250 ml graduated cylinders or 250 ml round bottom flasks. If stable emulsions are formed, these may be broken by diluting with toluene and slightly heating. At any rate, the oil/water system is separated using the procedure described below under the heading "Separation of Oil/Water Systems". If any liquid solvents are used as coinjectants, these are determined as described below under "Determination of Solvent Concentration." Note that it is necessary to record the pressure drop every time a sample is taken, as well as the mass injected and the running time. Also, at intervals of roughly every 0.25 pore volume of cold water injected, a traverse temperature profile is taken using the thermocouple 17 sliding in the thermowell 29 (FIG. 4). The run is stopped just before live steam is produced, i.e., when the temperature profile shows that the steam has reached the vicinity of the back pressure regulator.

The pack is allowed to cool by removing the vermiculite. Once it has cooled to room temperature, the pack may be depleted of the residual oil saturation by flushing it with an inert gas, such as nitrogen, and then with a low boiling point solvent, such as methylene chloride. This flushing is done at room temperature because at elevated temperature and pressures, chlorinated solvents decompose to form chlorine gas, free radicals and other species that are extremely corrosive and toxic. The residual water may be further extracted from the pack by warming the pack, applying a vacuum, using a dry-ice trap, and placing a magnesium perchlorate tube in front of the vacuum pack.

Often the quality of steam between runs varies. To avoid the tedious task of reproducing steam of identical quality, a method for comparing steam floods in terms of steam pore volume injected is described below under the heading "Measurement of Steam Pore Volumes Injected."

Figure 5:
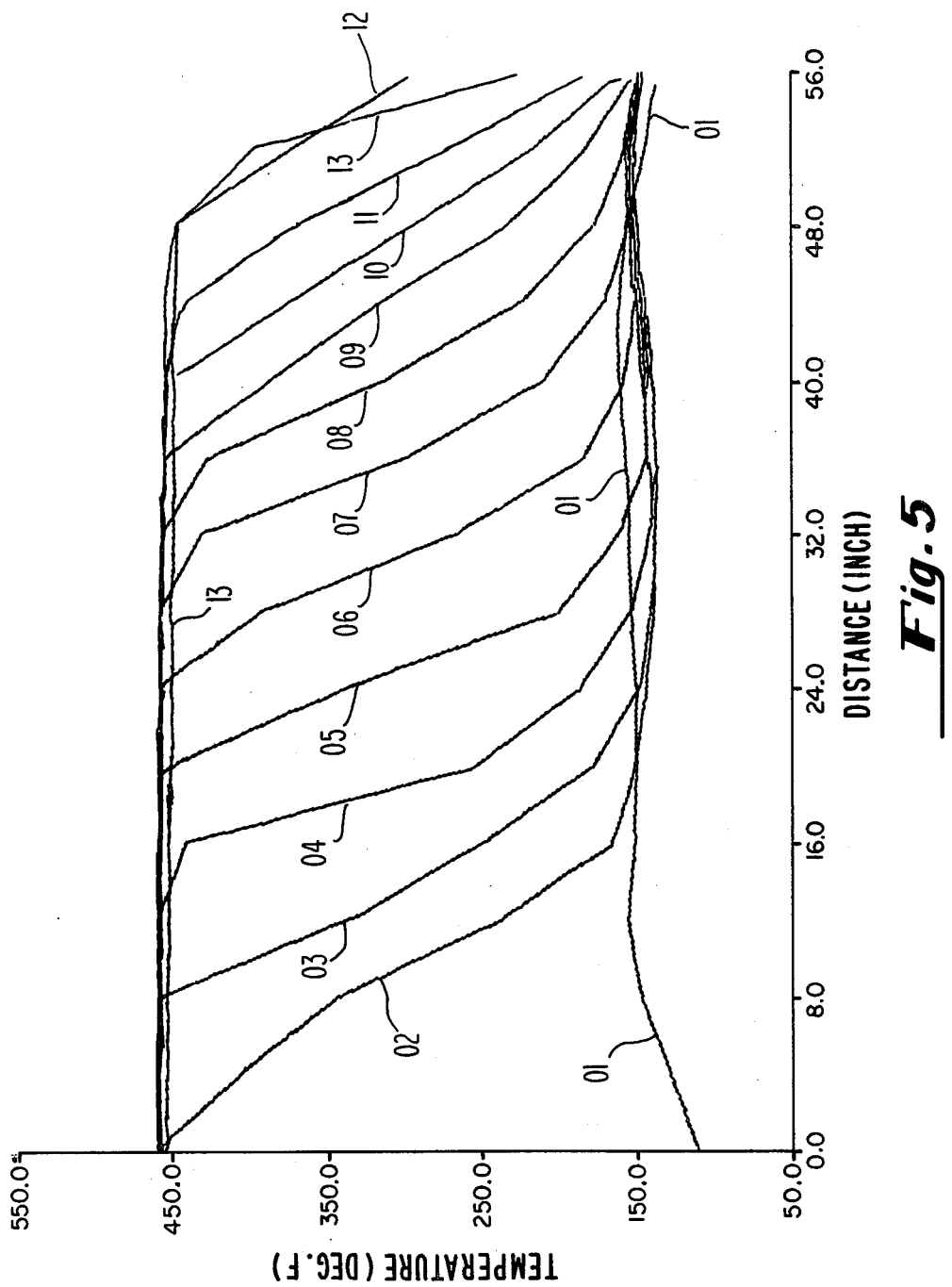
FIG. 5 is a graph showing typical results of experiments carried out according to the invention.

FIG. 5 shows typical results which can be obtained using the apparatus and method of the invention. The curves shown are successive graphs numbered along their center lines; Table I, below, shows the number of pore volumes of steam which had been injected at the time the corresponding readings were taken. The individual readings graphed and connected by the lines show temperature in the vertical axis, versus the distance of the thermocouple from the inlet end of the sample tube 28. It is clear from the data graphed in FIG. 5 that the steam front moves relatively uniformly down the length of the tube and that adequate prediction of the amount of steam of a given quality required to flush oil from one end to the other of the tube can be made.

TABLE I

| Curve No. | P.V. Steam Injected |
|---|---|
| 1 | 0.0 |
| 2 | 0.10 |
| 3 | 0.23 |
| 4 | 0.39 |
| 5 | 0.60 |
| 6 | 0.78 |
| 7 | 0.98 |
| 8 | 1.18 |
| 9 | 1.32 |
| 10 | 1.46 |
| 11 | 1.63 |
| 12 | 2.10 |
| 13 | 2.33 |

The following sections detail certain steps in the practice of the invention, as mentioned above.

PERMEABILITY DETERMINATION

Gas permeability K is determined using the following form of Darcy's Law:

$$Q_a = \frac{KA(P_1^2 - P_2^2)}{2\mu L} \quad (1)$$

or $$K = \frac{2Q_a \mu L}{A(P_1^2 - P_2^2)} \quad (2)$$

where
$Q_a$ = corrected gas flow rate and $$Q_a = \frac{P_m}{14.7} Q_m;$$

$Q_m$ = measured gas flow rate at room temperature and pressure,
$P_m$ = room pressure corrected for the water vapor at room temperature,
$\mu$ = gas viscosity, cp,
L = pack length, cm,
A = effective cross-sectional area of pack, i.e., area of pack—area of thermowell, cm², and $$P_1^2 = \left(\frac{P_{Inlet\ press.} + P_{room}}{14.7}\right)^2$$

and $$P_2^2 = \left(\frac{P_{room}}{14.7}\right)^2$$

EXAMPLE I

For an example of the above method let
T = 72° F.,
P = 75.21 cm Hg = 14.55 psi,
$P_{wv}$ = 0.3898 psi @ 72° F.,
$P_m$ = 14.55 − 0.3898 = 14.16 psi, $Q_m$ = 2.73 cu. ft/hr.

$$= \frac{2.73 \times 2832}{3600} = 21.48\ cc/sec,$$

$$Q_a = \frac{14.16}{14.7}(21.48),$$

= 20.69 cc/sec,

A = 19.47 cm²,
L = 81.12 cm,
$\mu$ = 0.018 cp(air), $$P_1^2 = \left(\frac{7.87 + 14.55}{14.7}\right)^2 = 2.3,$$

$$P_2^2 = \left(\frac{14.55}{14.7}\right)^2 = 0.98$$

Substituting in Equation 2

$$K = \frac{2(20.69)(0.018)(81.12)}{19.47(1.35)}$$

K = 2.30 darcies

It is evident that the permeability with respect to reservoir water or brine will be more meaningful than that measured with respect to gas. To determine water permeability $K_{sw}$ one may use the following equation:

$$K_{sw} = \frac{24.56\ Q\mu L}{D^2 \Delta P} \quad (3)$$

where:
Q = rate, cc/hr,
$\mu$ = viscosity, cp,
L = length of pack, ft.,
D = diameter of pack, in., and
$\Delta P$ = pressure drop in psi.

EXAMPLE II

For example, let
Q = 448 cc/hr.
$\mu$ = 0.9751 cp
L = 1.67 ft.
D = 0.917 in. and
$\Delta P$ = 1.18 psi $$K = 24.56\ \frac{(448)(0.9751)(1.67)}{(.917)^2(1.18)} = 18,057\ md\ or\ 18.057\ darcies$$

STEAM QUALITY MEASUREMENTS

Two methods of measurement of steam quality are useful:

a. Direct Measurement

The flow rate must be checked and the steam quality must be measured before each run. The steam is diverted to the vent condenser 13 (FIG. 2). Steam is allowed to heat the lines (which are insulated) to almost operating temperature. Afterwards, a polyethylene Dewar flask, filled with a known mass of water, is placed under the lead line from the 3-way valve 8 (FIG. 2). The temperature of the calorimeter water, which should be 5°-10° F. less than room temperature, is read and recorded. Then steam is diverted and a timer is started simultaneously. Steam is flowed for approximately two minutes. By knowing the rate and time of injection, the mass of the water added is determined. The Dewar flask should be weighed at the end of the test to provide both an independent measure of the mass and a check of leaks, if any, in and around the steam generator. The highest stable temperature reached in the calorimeter is read and recorded, and the steam quality is determined as follows:

EXAMPLE III

| | |
|---|---|
| Steam temperature, | 470° F. |
| Initial temperature of calorimeter, | $T_1 = 65°$ F. |
| Final temperature of calorimeter, | $T_2 = 81°$ F. |
| Mass of the water in the sample, | $m = 25.4$ g |
| Mass of water in calorimeter | $M = 1500.0$ g |
| Enthalpies (from ASME steam tables, 1967) | |
| of saturated liquid at 65° F. | $H_1 = 34.06$ Btu/lbm |
| of saturated liquid at 82° F. | $H_1 = 50.03$ Btu/lbm |

$$\text{Initial heat content} = \left(34.06 \frac{\text{Btu}}{\text{lbm}}\right)(1500.0 \text{ g})\left(\frac{2.205 \text{ lbm}}{1000 \text{ g}}\right) = 112.65$$

$$\text{Final heat content} = \left(50.03 \frac{\text{Btu}}{\text{lbm}}\right)(1525.0 \text{ g})\left(\frac{2.205 \text{ lbm}}{1000 \text{ g}}\right) = 168.23$$

Net gain in heat content = (168.23 − 112.65) Btu = 55.58

$$\text{Net gain in weight} = 25.0 \text{ g}\left(\frac{2.205 \text{ lbm}}{1000 \text{ g}}\right) = .055 \text{ lbm}$$

$$\text{Enthalpy for the injected steam} = \frac{55.58 \text{ Btu}}{.055 \text{ lbm}} = 1010.54$$

Enthalpy at 468° F.    $H_g = 1204.6$ Btu/lbm
                        $H_1 = 450.7$ Btu/lbm $$\text{Steam quality} = \frac{1010.5 - 450.7}{1204.6 - 450.7} = .742 \text{ or } 74.2\%$$

b. Calorimeter Measurement

This method is very similar to the previous method, except that a modified Parr calorimeter is used. A piece of stainless steel tube, ⅛ inch outside diameter, with a compression fitting at one end is coiled around the bomb calorimeter. Then, a calorimeter factor is found, i.e., the calorimeter is calibrated by burning a known compound, e.g. benzoic acid, in it. The water inside should have a temperature about 5°-10° F. less than room temperature. About three or four temperature readings are taken before introducing the steam. The steam is diverted and a timer is started simultaneously. The temperature is read and the highest stable temperature achieved is used in the calculations.

This method has the added advantage that heat losses of the calorimeter are taken into account, whereas the underlying assumption in the first method is that the heat losses are negligible. An example of this latter method is shown below as Example IV.

EXAMPLE IV

| | |
|---|---|
| Steam flow | = 12.40 cc/min (pump rate) |

-continued

| | |
|---|---|
| Time of flow into calorimeter | = 3.0 min |
| Initial temperature | = 74.50° F. |
| Final temperature | = 91.50° F. |
| Change in temperature | = 17.0° F. |
| Steam temperature | = 520° F. |
| Calorimeter factor | = 2541 |
| Enthalpies, at 520° F. | $H_g = 1198$ Btu/lbm |
| | $H_1 = 514$ Btu/lbm |

Enthalpy for injected steam = (17.0)(2541)/(37.2) = 1161.2

$$\text{Steam quality} = \frac{1161 - 514}{1198 - 514} = .94 \text{ or } 94\%$$

SEPARATION OF OIL/WATER SYSTEMS

The single, most difficult, time-consuming phase of development of the modeling methods according to the invention was separation of the very stable oil/water emulsions which are produced as a result of steam-flooding experiments. The purpose is of course the closing of the mass balance for both oil and water. The importance of material balance resides in the fact that only when this is evaluated can the experimental results be truly significant. The best procedure is as follows:

During the steam run, samples are collected in 250 ml round bottom flasks. By carefully rotating the flask, the oil is allowed to stick to the walls and the water can be removed. In the presence of an emulsion, the sample is diluted with about 100 ml of toluene, since this dissolves much of the emulsion and forms an azeotrope with water, making its removal easier. The round bottom flask is then attached to the lower end of a rotary evaporator, such as that sold under the tradename "Rota-vap." A vacuum of about 4.2–5.0 mm Hg is carefully applied to the system. The Rota-vap is operated at a low rotation rate, and a constant temperature (40°–45° C.) is maintained in the oil bath. The extraction is stopped when, determined visibly, all the solvent has disappeared. These conditions are extreme and result in removal of the light ends, so a sample of clean oil similar to that used in flooding the pack, is first submitted to the same procedure to determine the average weight loss. This procedure thus changes the infrastructure of the oil, but since only the masses of components are relevant, it is adequate to solve the emulsion problem.

DETERMINATION OF SOLVENT CONCENTRATION

The following procedure is useful when the steam co-injectant, or the sole injectant, is a liquid solvent. This method utilizes the nearly linear relationship between the density of an oil solution as a function of the concentration of solvent present.

One should first establish a plot by measuring the density of the oil, which has undergone the steam flooding process without solvent, and of the pure solvent. At least 2, preferably 3, other samples with different solvent concentrations, e.g., 25%, 50%, 75% are measured. After the values are plotted, one can then measure the density of an unknown and thus determine the concentration of the solvent.

MEASUREMENT OF STEAM PORE VOLUMES INJECTED

It is difficult to hold the steam quality in several runs at the same value; typically experimental values are in the range of 80%±10%. Changes in the steam quality introduce variations in the specific volumes of the steam. Thus, it is important to convert from "cold water injected" to "steam pore volumes injected" to objectively compare the results obtained between runs of different steam qualities. This may be done as in Example V:

EXAMPLE V

| Measured data: | |
|---|---|
| Steam temperature | = 610° F. |
| Cold water Injection rate | = 12.55 g/min |
| Steam quality | = 91% |

First we determine the specific volumes of saturated steam and saturated liquid, $V_g$ and $V_f$, respectively, at 610° F.

$$V_g = .24796 + (610 - 608)\left(\frac{.24796 - .23865}{608 - 612}\right)$$

$V_g = 0.243305$ cu ft/lbm, and $$V_f = .02402 + (610 - 608)\left(\frac{.02402 - .02422}{608 - 612}\right)$$

$V_f = 0.02412$ cu ft/lbm.

Therefore, the specific volume of the injected steam $V_{is}$ is:

$V_{is} = (.243305)(.91) + (.02412)(.09)$ $= .22358$ cu ft/lbm.

The injection rate of cold water into the steam generator is 12.55 g/m or 1.66 lbm/hr., and the steam injection rate $S_{ir}$ is $S_{ir} = (1.66$ lbm/hr$)(.22358$ cu ft/lbm$)$ $= .37122$ cu ft/hr;

$= .00619$ cu ft/min.

As discussed above, the pore volume of the pack may be calculated or measured using different methods. Normally, using tap water or brine, the results obtained are within 1% of the calculated value.

An example is as follows:

EXAMPLE VI

The pore volume may be obtained from the following equations:

$$PV = V_{tube} - V_{sand} - V_{thermowell},$$

where $V_{tube} = 2\pi r^2 l = 2154.5$ cc $V_{sand} = \frac{\text{mass of sand}}{\rho_{sand}} = 1201.3$ cc $V_{thermowell} = 2\pi r^2 l = 6.8$ cc PV = 948.4 cc, or
PV = 0.03348 cu ft.

Therefore, the steam pore volumes injected, $PV_i$, are $$PV_i = \frac{(S_{ir})(\text{Runtime})}{PV}$$

In a typical case, every minute during the steam run 0.185 pore volumes of steam were injected into the pack.

It will be appreciated by those skilled in the art that the above described methods and apparatus for simulation of a steam flooding operation are exemplary of various improvements and modifications that can be made thereto and accordingly that the above description should not be considered to limit the scope of the invention which is more correctly defined by the following claims.

We claim:

1. Apparatus for the modeling of steam flooding recovery operations as applied to an oil bearing formation comprising:
   a chamber for containing sample formation material and oil to be tested;
   means for generating high pressure steam of controllably varying quality and applying said steam to said reservoir; and
   means for recording the temperature at plural locations in said chamber and the pressure in said chamber as a function of time.

2. The apparatus of claim 1 wherein said steam generator comprises a tube in contact with a heat sink in a controllable heater.

3. The apparatus of claim 1 wherein said chamber is an elongated tubular member and said sample material fills said member.

4. The apparatus of claim 3 wherein a tubular thermowell is located substantially in the center of said sample for containment of temperature transducers.

5. The method of simulation of a steam flooding operation to be carried out in an oil containing formation comprising the steps of:
generating a physical representation of said formation by packing a quantity of sand in a sealed chamber;
measuring the mass, permeability and porosity of said sand;
flushing said sand;
filling said sand with an oil so as to simulate the conditions in said formation; and
supplying steam to said chamber and continuously monitoring the pressure within said chamber and the temperature at varying points in said chamber so as to monitor the movement of said steam through said chamber.

6. The method of claim 5 further comprising the step of controlling the quality of said steam supplied to said chamber.

7. The method of claim 5 further comprising the step of controlling the mass of steam injected into said reservoir and measuring the amount of oil produced.

8. A method of simulation of a steam flooding oil recovery operation, in which steam is supplied to a chamber containing a sand/oil mixture chosen to effectively simulate real conditions,
wherein the quality of said steam supplied to said chamber is measured and controlled and an accurate measurement of the mass of steam supplied and of the relation between the mass of the steam supplied and the mass of the oil produced is calculated.

9. The method of claim 8 wherein the temperature within said chamber is monitored at various points and recorded as a function of time.

10. The method of claim 8 wherein the pressure within said chamber is monitored and recorded as a function of time.

* * * * *